(12) United States Patent
Giaconi et al.

(10) Patent No.: US 10,637,592 B2
(45) Date of Patent: Apr. 28, 2020

(54) SYSTEM AND METHODS FOR MEASURING PERFORMANCE OF AN APPLICATION SPECIFIC INTEGRATED CIRCUIT INTERCONNECT

(71) Applicant: CHRONOS TECH LLC, San Diego, CA (US)

(72) Inventors: Stefano Giaconi, San Diego, CA (US); Giacomo Rinaldi, San Diego, CA (US); Matheus Trevisan Moreira, San Diego, CA (US); Matthew Pryor, San Diego, CA (US); David Fong, San Diego, CA (US)

(73) Assignee: CHRONOS TECH LLC, San Diego, CA (US)

( * ) Notice: Subject to any disclaimer, the term of this patent is extended or adjusted under 35 U.S.C. 154(b) by 79 days.

(21) Appl. No.: 16/053,486

(22) Filed: Aug. 2, 2018

(65) Prior Publication Data
US 2019/0044625 A1    Feb. 7, 2019

Related U.S. Application Data

(60) Provisional application No. 62/541,609, filed on Aug. 4, 2017.

(51) Int. Cl.
*H04L 1/00* (2006.01)
*H04B 17/15* (2015.01)
*H04B 17/29* (2015.01)

(52) U.S. Cl.
CPC ............ *H04B 17/15* (2015.01); *H04B 17/29* (2015.01)

(58) Field of Classification Search
None
See application file for complete search history.

(56) References Cited

U.S. PATENT DOCUMENTS

| | | |
|---|---|---|
| 4,189,625 A | 2/1980 | Strandberg |
| 5,689,644 A | 11/1997 | Chuo |
| 6,208,644 B1 | 3/2001 | Pannell |
| 8,365,113 B1 | 1/2013 | Bhardwaj et al. |
| 9,685,953 B1 | 6/2017 | Sadowski |
| 9,921,992 B2* | 3/2018 | Hilgemberg Pontes ..................... G06F 13/4226 |
| 9,977,853 B2 | 5/2018 | Giaconi et al. |
| 10,235,488 B2 | 3/2019 | Giaconi et al. |
| 2002/0105745 A1 | 8/2002 | Kim |
| 2003/0035496 A1 | 2/2003 | Noda |
| 2004/0131062 A1* | 7/2004 | Horie .................. H04L 12/5601 370/395.1 |
| 2004/0151209 A1 | 8/2004 | Cummings |
| 2005/0180514 A1 | 8/2005 | Choi et al. |
| 2005/0200388 A1 | 9/2005 | Har et al. |
| 2006/0007236 A1 | 1/2006 | Takagi et al. |
| 2008/0285743 A1 | 11/2008 | Yokota et al. |

(Continued)

*Primary Examiner* — Phirin Sam
(74) *Attorney, Agent, or Firm* — Procopio, Cory, Hargreaves & Savitch LLP; Mark W. Catanese

(57) ABSTRACT

This application discloses circuits and apparatus configured to measure performance of asynchronous circuits by injecting data in to inputs of asynchronous circuits and consuming data from the outputs without interfering in the functionality of the asynchronous circuits. This application also discloses systems and methods for assessing the performance of asynchronous channels and/or IP blocks by providing an unambiguous performance value which can be used for performance analysis and comparison.

19 Claims, 10 Drawing Sheets

(56) References Cited

U.S. PATENT DOCUMENTS

| | | |
|---|---|---|
| 2008/0304430 A1 | 12/2008 | Zhuyan |
| 2009/0106719 A1 | 4/2009 | Stevens |
| 2009/0268760 A1* | 10/2009 | Smyers ................ G06F 13/128 370/536 |
| 2009/0285341 A1* | 11/2009 | Pukkila ................... H04L 25/00 375/346 |
| 2010/0042573 A1* | 2/2010 | Wenig ....................... G06F 9/54 706/47 |
| 2010/0127742 A1 | 5/2010 | Chen |
| 2010/0285743 A1 | 11/2010 | Li et al. |
| 2013/0259146 A1* | 10/2013 | Mangano .............. H03M 13/51 375/259 |
| 2014/0064096 A1 | 3/2014 | Stevens |
| 2014/0240326 A1 | 8/2014 | Cutter et al. |
| 2015/0120978 A1 | 4/2015 | Kalyanasundharam |
| 2015/0121324 A1 | 4/2015 | Thonnart |
| 2016/0006658 A1* | 1/2016 | Averi ...................... H04L 45/00 370/236 |
| 2016/0034409 A1 | 2/2016 | Kim |
| 2016/0188522 A1 | 6/2016 | Hilgemberg Pontes et al. |
| 2017/0091130 A1 | 3/2017 | Matsunaga |
| 2017/0126425 A1 | 5/2017 | Giaconi et al. |
| 2017/0180800 A1 | 6/2017 | Mayrand |
| 2017/0289057 A1* | 10/2017 | Jiang ..................... H04L 47/527 |
| 2017/0308721 A1 | 10/2017 | Pedersen |
| 2018/0097720 A1* | 4/2018 | Jaffer ..................... H04L 45/22 |
| 2018/0109415 A1 | 4/2018 | Han et al. |
| 2018/0227015 A1* | 8/2018 | McCormack ......... H04W 76/14 |

\* cited by examiner

SYSTEM AND METHODS FOR MEASURING PERFORMANCE OF AN APPLICATION SPECIFIC INTEGRATED CIRCUIT INTERCONNECT

RELATED APPLICATIONS INFORMATION

This application claims benefit of priority under 35 U.S.C. 119(e) to U.S. Provisional Patent Application No. 62/541,609 filed on Aug. 4, 2017 entitled "ACCUGAUGE," the disclosure of which is incorporated herein by reference in its entirety.

This present application is related to U.S. Provisional Patent Application Ser. No. 62/360,226 filed on Jul. 8, 2016. This application is also related to Published Patent Application Serial Number U.S. Ser. No. 15/645,917 titled: "SYSTEMS AND METHODS FOR THE DESIGN AND IMPLEMENTATION OF AN INPUT AND OUTPUT PORTS FOR CIRCUIT DESIGN"; and Published Patent Application Serial Number U.S. Ser. No. 15/344,441 titled: "SYSTEM AND METHOD FOR APPLICATION SPECIFIC INTEGRATED CIRCUIT DESIGN"; and published Patent Application Serial Number U.S. Ser. No. 15/344,420 titled: "APPLICATION SPECIFIC INTEGRATED CIRCUIT LINK"; and Published Patent Application Serial Number U.S. Ser. No. 15/344,416 titled: "APPLICATION SPECIFIC INTEGRATED CIRCUIT INTERCONNECT". All of the above are incorporated herein in their entirety as if set forth in full.

BACKGROUND

1. Technical Field

The various embodiments described herein are related to application specific integrated circuits (ASICs), and more particularly to the design of various ASICs.

2. Related Art

Continuing advances in semiconductor device fabrication technology have yielded a steady decline in the size of process nodes. For example, 22 nanometer (nm) process nodes were introduced in 2010 but were quickly succeeded by 14 nm fin field-effect transistors (FinFETs) in 2014 while 5 nm process nodes are projected for 2020.

The decrease in process node size allows a growing number of intellectual property (IP) cores or IP blocks to be placed on a single ASIC chip. That is, modern ASIC designs often spread numerous process nodes across a comparatively large silicon die and include combinations of IP blocks and logic functions. At the same time, modern technology also requires increased connectivity and large data transfers between various IP blocks. To avoid the challenges of highly constrained clocked signals, and to minimize the impact of Process Voltage and Temperature (PVT) variation, the industry is moving toward the implementation of clock-less circuits. Chronos channels 100 represented in FIG. 1 are an example of clock-less quasi-delay insensitive (QDI) communication channel.

Clock-less designs implemented using QDI asynchronous templates have the advantage of being robust to PVT, but the advantage comes at the cost of introducing significant extra area and routing, as well as more complicated test and binning. Area and routing overhead are caused due to the more complex hardware required to implement QDI logic. That is due to the fact that data representation follows delay insensitive encoding schemes, which usually rely on more wires to represent a data word than the traditional single rail Boolean format used in synchronous designs.

Test and binning of asynchronous circuits is more complicated due to the fundamental structure used to build them. Rather than having common flops with a single clock signal controlling the sequencing of events, they rely on local handshake between special components. This way, traditional design for testability test techniques, like scan chains, are not directly compatible. Furthermore, the performance of asynchronous circuits is less predictable, given their adaptable nature of accommodating delay variations caused by process uncertainties. This complicates not only the testing of fabricated integrated circuits, but also their binning.

Asynchronous circuits are becoming more and more an essential element of complex system on a chip (SoC) design, but performance measurement and test issues have limited the large deployment of these technologies. Chronos Channels 100, for example, overcome the area and routing overheads by adding temporal compression/de-compression within the channel itself. Unfortunately, testing and binning these circuits is still challenging. Other clock-less circuit templates, like those based on bundled-data schemes share the same issues of test and binning with QDI circuits. The difference is that they trade off robustness for reduced area and power figures. Nevertheless, the basic blocks used to implement these circuits are not directly compatible to standard design for test methodologies and their performance is not predictable, as traditional synchronous designs.

Therefore, what is needed is an apparatus and method that overcome the problem of measuring and testing maximum performance and margins of asynchronous circuits.

SUMMARY

Apparatuses and methods for ASIC design are provided.

According to one aspect, a circuit is provided. The circuit includes a producer circuit connected to a transmitter side of an asynchronous channel between a first IP block and a second IP block, the producer configured to bypass a communication path between the first and second IP blocks and comprising a data generator configured to generate a plurality of data signals each in response to receiving an acknowledgment signal of a plurality of acknowledgement signals from the asynchronous channel. The circuit also includes a consumer circuit connected to a receiver side of the asynchronous channel, the consumer circuit configured to bypass the communication path and comprising validity detector logic configured to detect any data signals received at the consumer from the asynchronous channel, the consumer circuit configured to generate the plurality of acknowledgment signals each in response to the detected data signals. Furthermore, the circuit includes a measurement circuit configured to receive the plurality of acknowledgement signals from the asynchronous channel and determine a value representative of a performance of the asynchronous channel based on the received plurality of acknowledgment signals.

According to another aspect, an apparatus is provided configured to measure performance of asynchronous circuits by injecting data into inputs of the asynchronous circuits and consuming data from the outputs of the asynchronous circuits without interfering in the functionality of the asynchronous circuits.

According to another aspect, a method for assessing a performance of an asynchronous channel provided. The method includes activating a performance measurement mode of a producer circuit and consumer circuit, the producer circuit connected to a transmitter side of an asynchronous channel between a first IP block and a second IP block and the consumer circuit connected to a receiver side of the asynchronous channel. The method also includes injecting a plurality of data signals into the asynchronous channel by the producer circuit, wherein each of the plurality of data signals is generated by the producer circuit based, in part, on receiving an acknowledgement signal from the asynchronous channel and injecting a plurality of acknowledgement signals into the asynchronous channel by the consumer circuit, wherein each of the plurality of acknowledgement signals is generated by the consumer circuit based, in part, on detecting any data signal received from the asynchronous channel. Furthermore, the method includes determining an unambiguous value based, in part, on the plurality acknowledgement signals, wherein value is representative of the performance of an asynchronous channel.

According to another aspect, a method is provided that assesses the performance of an asynchronous channel by providing an unambiguous performance value which can be used for performance analysis and comparison.

According to another aspect, a method is provided that evaluates a speed margin and/or functionality of a channel which allows the channel to interface with synchronous or asynchronous IP blocks.

According to another aspect, a method is provided that evaluates an asynchronous channel functionality without needing a connected producer IP block or consumer IP block to be operational.

According to another aspect, a method is provided that performs channel by channel real-time performance measurements at one or more current operating condition, such as, but not limited to, power supply voltage and temperature, for power, speed or others optimization matrix.

According to one aspect, a port is provided. The port includes a producer circuit configured to receive data from a first stage and forward the data to a second stage while operating in a producer bypass mode, and, while operating in a transmission measurement mode, configured to generate and transmit a plurality of data signals to the second stage, each data signal generated in response to receiving an acknowledgment signal from the second stage. The port also includes a consumer circuit configured to receive an acknowledgement signal from the second stage and forward the acknowledgement signal to the first stage while operating in a consumer bypass mode, and, while operating in a reception measurement mode, configured to generate a plurality of acknowledgment signals each in response to receiving a data signal from the second stage. Furthermore, the port includes a measurement circuit configured to receive the plurality of acknowledgement signals and determine a performance value based on the received plurality of acknowledgment signals.

According to another aspect, an apparatus, for example, a port, is provided configured to measure latency and/or throughput performance of any asynchronous IP block or channel.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

This application describes implementations of circuits and methods to facilitate performance measurements and tests on any clock-less architecture.

Figure 1:
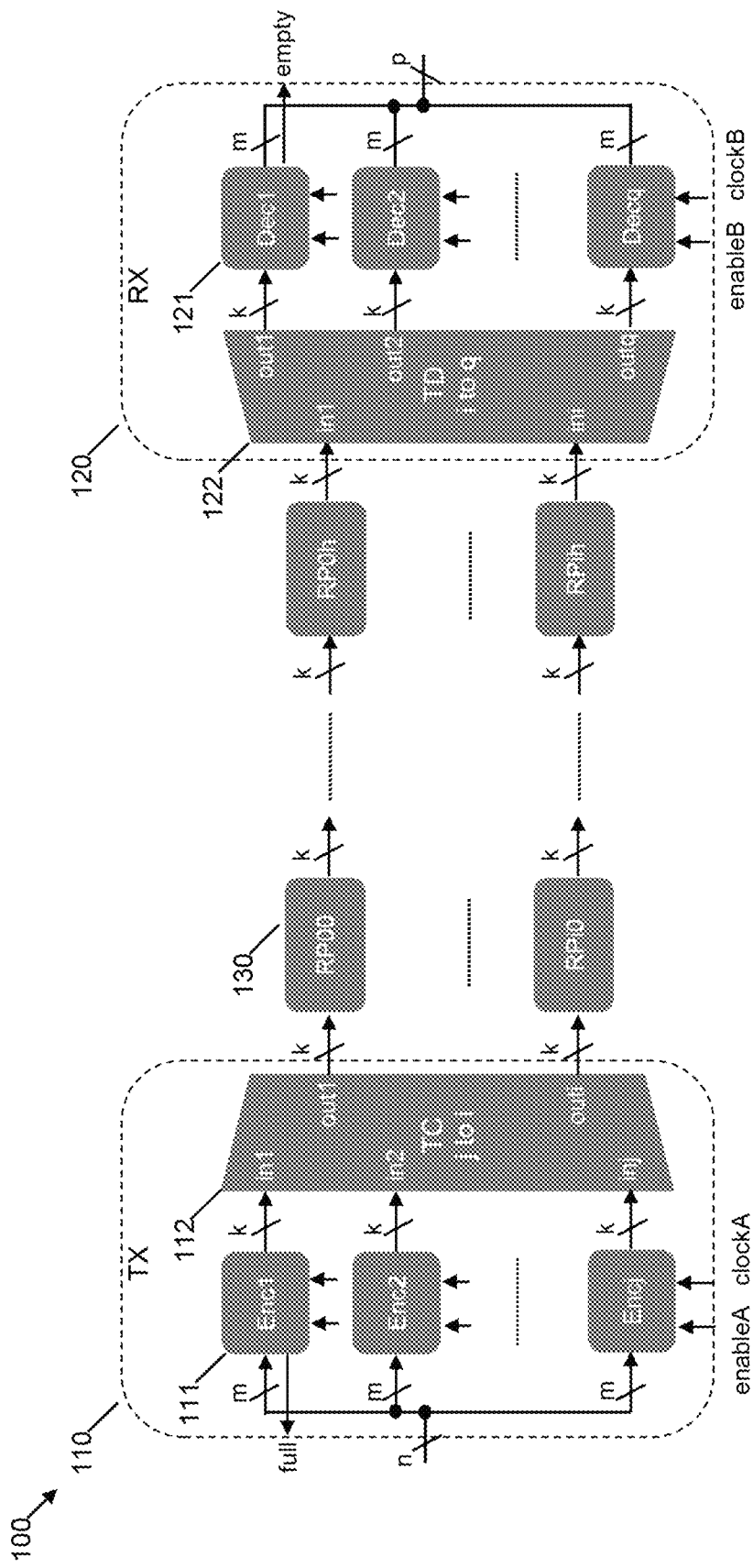
FIG. 1 is a general block diagram illustrating a possible embodiment of a channel in accordance with one embodiment.

As one example of clock-less interconnect, FIG. 1 shows a Chronos Channel, 100, which is an ASIC Interconnect that allows transmitter blocks to send data to receiver blocks. Chronos Channels stand out by relying on a reduced set of timing assumptions and being robust against delay variations. To do so, Chronos Channels transmit data using delay insensitive (DI) codes and Quasi-Delay-Insensitive (QDI) logic. In this way, Chronos Channels are insensitive to all wire and gate delay variations, but for those belonging to a few specific forking logic paths called isochronic forks. Also, a unique characteristic of a Chronos Channel, when compared to related solutions, is that it uses temporal compression (asynchronous serialization) in its internal paths to reduce the overheads of QDI logic and efficiently transmit data. In fact, data can be compressed using different ratios, which can be any rational number (as long as a technology specific maximum frequency restriction is respected). In this way, a Chronos Channel is defined by the combination of a DI code (and related handshake protocol), a temporal compression ratio and the hardware required to encode, decode, encrypt, decrypt, compress, decompress and transmit data.

Additional details and examples of clock-less interconnects and applications thereof can be found, for example, in U.S. patent application Ser. No. 15/645,917 titled: "SYSTEMS AND METHODS FOR THE DESIGN AND IMPLEMENTATION OF AN INPUT AND OUTPUT PORTS FOR CIRCUIT DESIGN"; and U.S. patent application Ser. No. 15/344,441 titled: "SYSTEM AND METHOD FOR APPLICATION SPECIFIC INTEGRATED CIRCUIT DESIGN"; and U.S. patent application Ser. No. 15/344,420 titled: "APPLICATION SPECIFIC INTEGRATED CIRCUIT LINK"; and U.S. patent application Ser. No. 15/344,416 titled: "APPLICATION SPECIFIC INTEGRATED CIRCUIT INTERCONNECT." The disclosures of each are incorporated herein in their entirety as if set forth in full.

Figure 2:
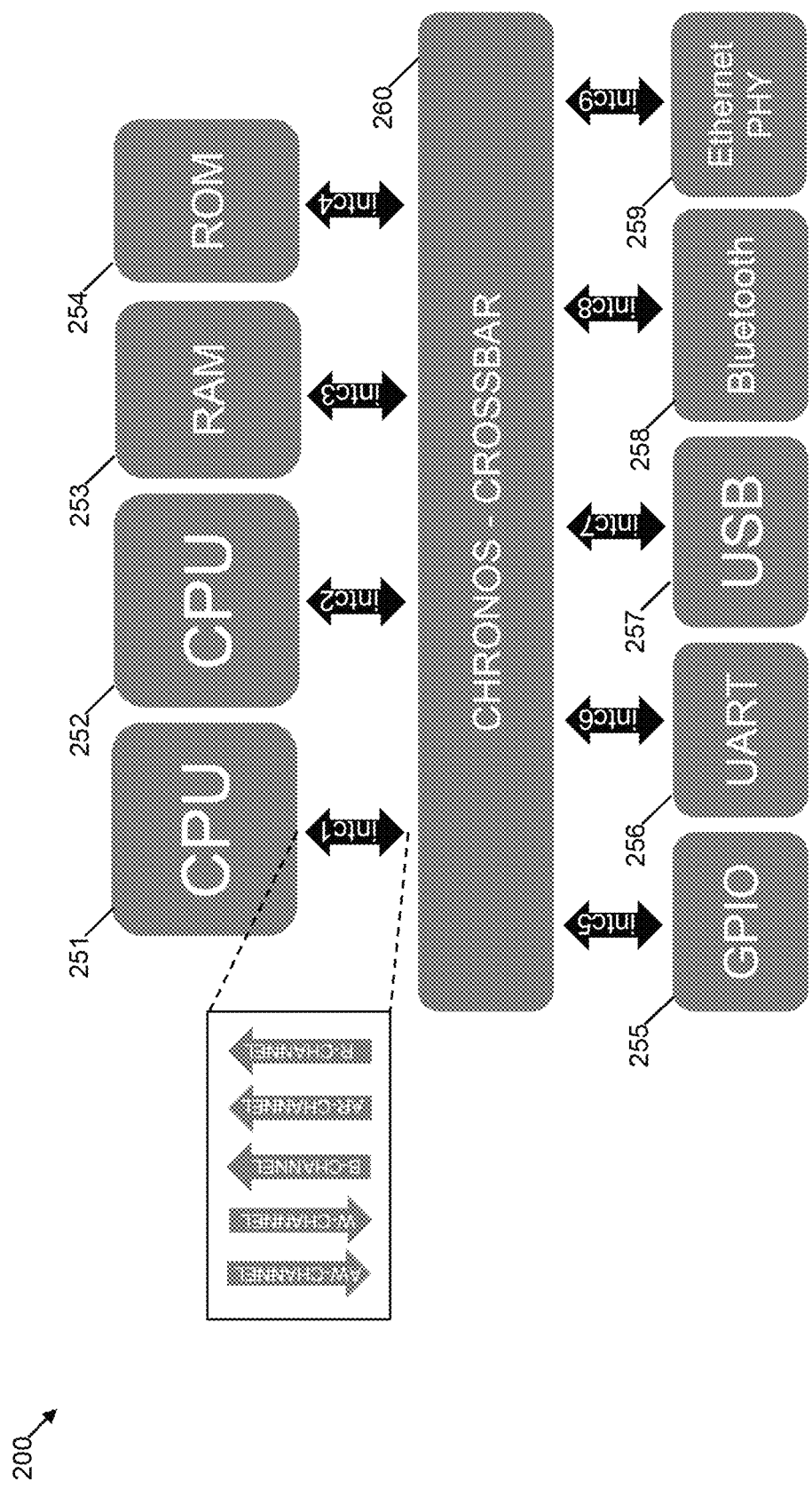
FIG. 2 is a general block diagram of a possible embodiment of a SoC connected through channels, such as described in FIG. 1, and a crossbar in accordance with some embodiments.

FIG. 2 shows various IPs such as CPUs (251, 252), RAM (253), ROM (254), GPIO (255), UART (256), USB (257), Bluetooth (258), and Ethernet PHY (259) connected through bundles of Chronos channels to a Chronos crossbar (260).

Figure 3:
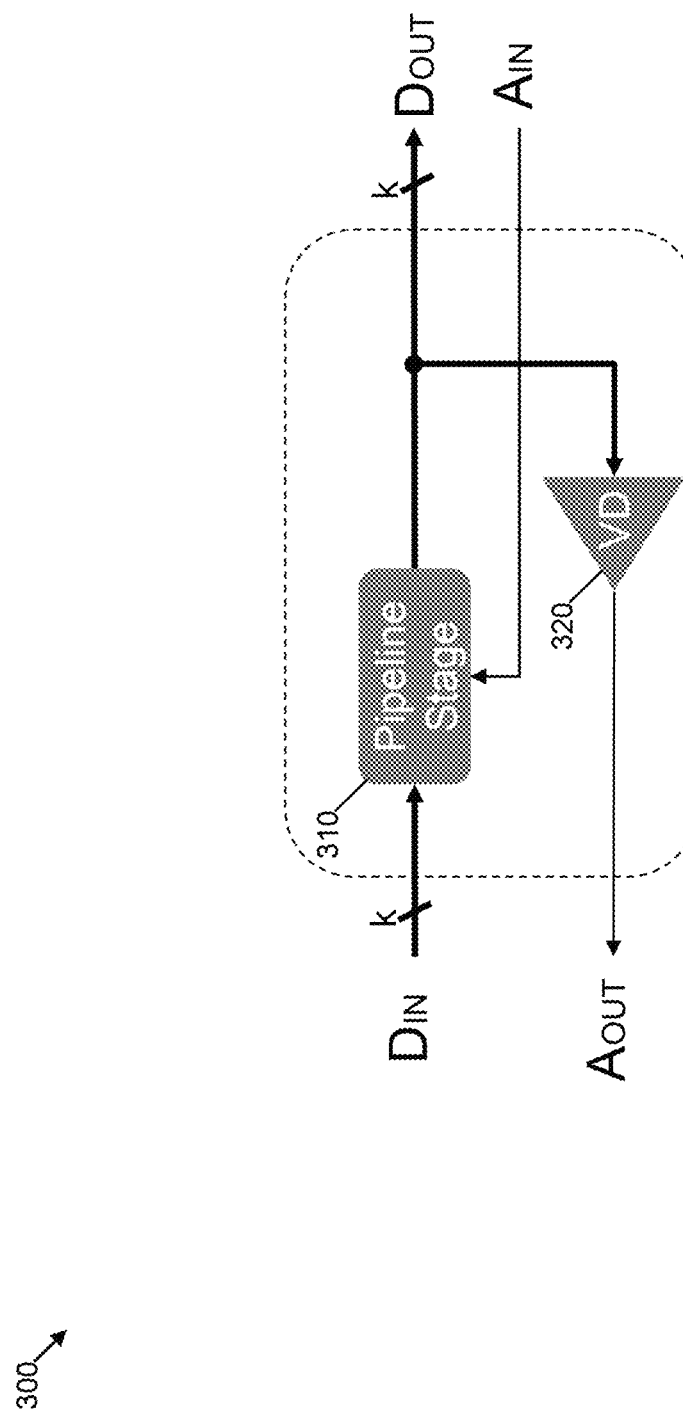
FIG. 3 represents a general diagram illustrating a possible embodiment of a clock-less repeater in accordance with some embodiments.

In a clock-less channel, data is safely propagated by connecting repeaters in a pipeline fashion, for example, as shown in FIG. 1 as repeaters 130. FIG. 3 shows one possible implementation of a repeater 300. Repeater 300 may be implemented as QDI repeater 130 of FIG. 1. Repeater 300 comprises a pipeline stage (310) which stores data ($D_{IN}$) received from a previous stage, for example, from a previous repeater and/or a transmitter (e.g., transmitter 110 of FIG. 1). Repeater 300 also comprises a Validity Detector (VD) (320) which generates an acknowledgment signal (e.g., $A_{OUT}$) to inform a previous stage when new data can be safely transmitted to repeater 300. The repeater 300 may transmit the received data to a subsequent stage (e.g., a subsequent repeater and/or receiver 120 of FIG. 1) as new data ($D_{OUT}$). Based on safe reception of $D_{OUT}$ at the next stage, the repeater 300 may receive an acknowledgement signal ($A_{IN}$) to inform the current stage (e.g., repeater 300) that it is safe to transmit. Different hardware implementations are possible, following either QDI logic or Bundled Data (BD) architecture (2 or 4 phases), granted that proper handshake protocol is maintained.

Figure 4:
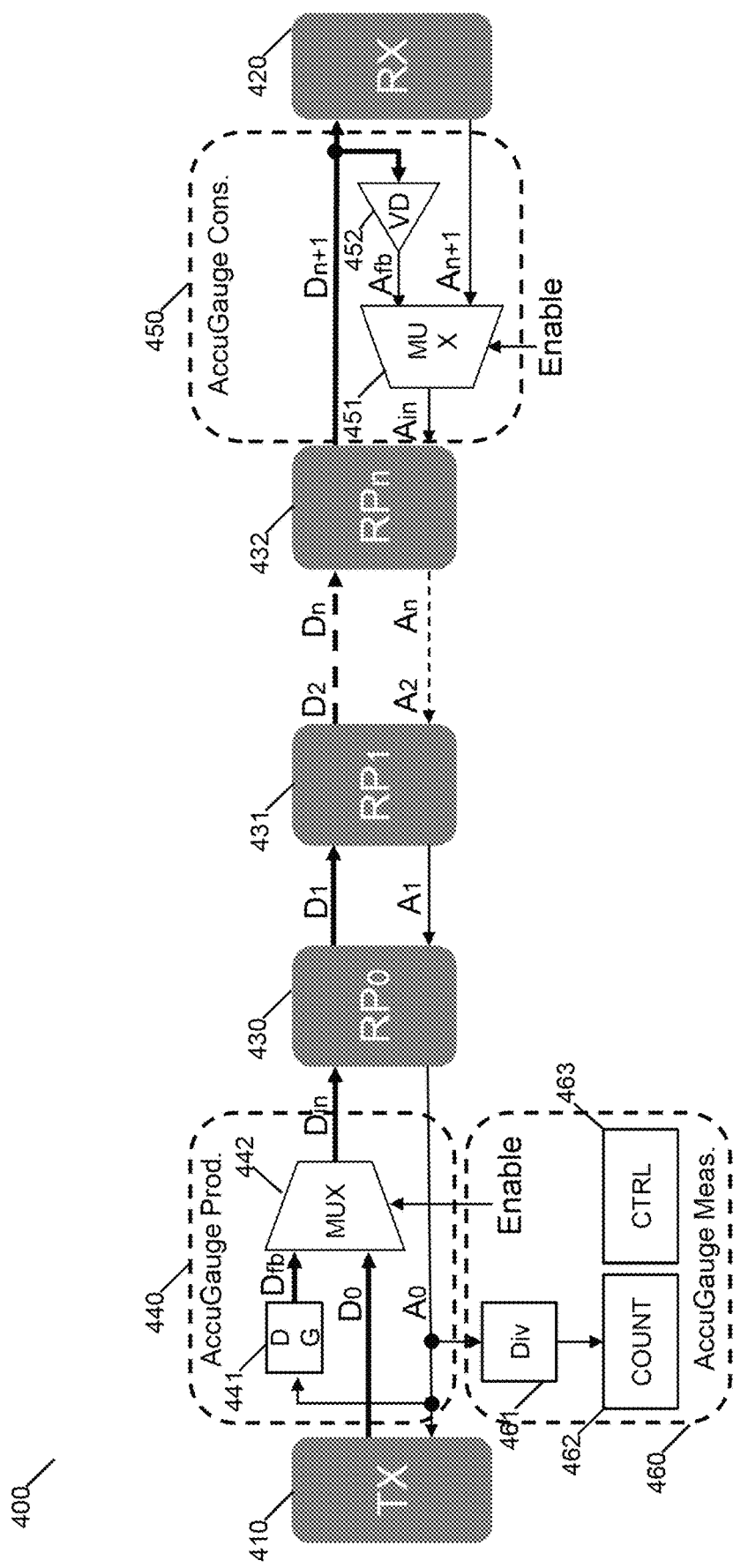
FIG. 4 is a general block diagram of the AccuGauge feature applied to a clock-less channel for transmission in accordance with an example embodiment.

AccuGauge technology enables measurement of maximum performance for any clock-less channel directly on die, or alternatively off-die in such a configuration. FIG. 4 shows a possible implementation of a circuit 400 in accordance with the present application. For example, FIG. 4 schematically illustrates a block diagram of circuit 400 comprising the features described herein where the AccuGauge Measurement circuit 460 is applied to a transmission side of a clock-less channel. FIG. 4 depicts a transmitter (TX) 410, a receiver (RX) 420, and repeaters (RP0-RPn) 430-432 that may be similar to TX 110, RX 120, and repeaters 130 of FIG. 1. The circuit 400 also includes an AccuGauge Producer 440 positioned on the transmitter side, for example, between the TX 410 and repeater 430. Similarly, an AccuGauge Consumer 450 is positioned on the receiver side, for example, between the RX 450 and repeater 432. Other configurations are possible, as described throughout the present application.

In an asynchronous channel, the throughput can be throttled by the RX, depending on its current workload. Hence the benefit of adding a bypass feature in the AccuGauge Consumer 450, in order to measure the maximum performance of the channel, regardless of the RX speed. On the receiver side, AccuGauge Consumer (450) is comprised of MUX (451) selecting either the regular acknowledge signal coming from the receiver (An+1), or, when AccuGauge measurement is enabled, a feedback output acknowledgement signal (Afb) generated by a validity detector (452). For example, incoming date (Dn+1) received from the clock-less channel (e.g., RPn 432) intended for RX 420 may be received by the validity detector 452, which generates an output acknowledgment signal Afb that is fed back to and received by the MUX 451. MUX (451) outputs an acknowledge signal ($A_{IN}$) to the previous stage based on which signal, acknowledge signal (An+1) or output Afb, is selected.

In an asynchronous channel, the throughput can be throttled by the TX, depending on its current workload. Hence the benefit of adding a bypass feature in the AccuGauge Producer 440, in order to measure the maximum performance of the channel, regardless of the TX speed. On the transmitter side, AccuGauge Producer (440), is comprised of a MUX (442) which selects either the regular data coming from the TX(D0) or, when AccuGauge measurement is enabled, the data produced by a Data Generator (DG) (441) triggered by the acknowledge signal coming from the first repeater (A0). The data generated by DG 441 can be user specified or random to measure various performance cases.

Once AccuGauge is enabled, in various embodiments, the circuitry bounded by the transmitter and receiver enters in a loopback mode, where AccuGauge Consumer 450 consumes the data as soon as it enters its input ports generating back an acknowledge signal Ain, and the AccuGauge Producer 440 keeps producing new data as soon as its acknowledge input A0 triggers. This way, data is injected to the circuit at the fastest rate that it can consume it. This rate is only limited by the maximum allowable speed for that specific channel, given the cyclic nature of asynchronous circuits.

Generically speaking, certain embodiments of this system may start behaving like a digital oscillator. The speed of the circuit can be measured, for example, by an AccuGauge Measurement block 460 communicatively coupled to the AccuGauge Producer 440. The AccuGauge Measurement block 460 may comprise a Control block 463 that may enable and control AccuGauge Measurements as described herein, a Count block 462, and an optional Divider block 461. In various embodiments, the speed of the circuit 400 can be measured, for example, by counting (either directly or after the optional Divider block 461, which may be configured to lower the frequency of the signal) the pulses generated in the acknowledge signal (by the COUNT block 462) for a predetermined amount of time through the AccuGauge Measurement (460) block. For example, the acknowledgement signal (A0) may be received by the AccuGauge Measurement (460) block. The acknowledgement signal may comprise multiple pulses generated by the acknowledgements along the circuit 400, and the Count block 462 may count these pulses for a determined amount of time to calculate a speed of the circuit. As mentioned above, the optional Divider block 461 may be configured to receive the acknowledgement signal (A0) to lower the frequency for improved accuracy in counting at the counter block 462. By doing so, the intrinsic data propagation of an asynchronous circuit, considering all its internal cycles can be converted into a meaningful and measurable value. In some implementations, that the AccuGauge Measurement block 460, can be enabled also during normal link operation, allowing the measurement of the actual performance of the link without interfering with the TX 410 and RX 420 operations. This measurement though may not represent the maximum performance because of the actual TX and or RX throttle capabilities.

Figure 5:
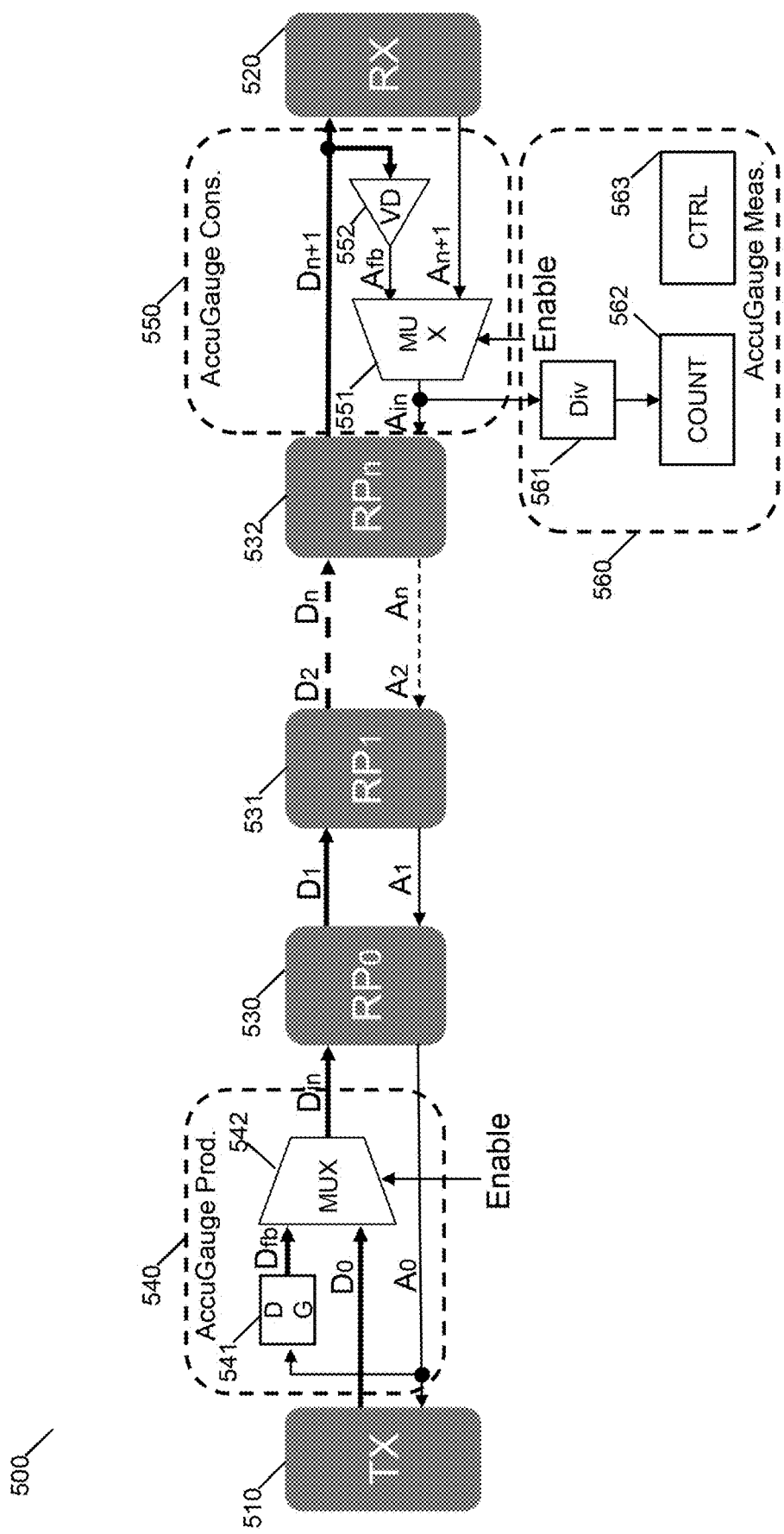
FIG. 5 is a general block diagram of the AccuGauge feature applied to a clock-less channel for reception in accordance with an example embodiment.

A possible variation is shown also in FIG. 5, where the AccuGauge Measurement block can be moved to the receiver side. FIG. 5 may be substantially similar to FIG. 4, except that the AccuGauge Measurement block 560 is communicatively coupled to the AccuGauge Consumer 550.

Another possible variation is where the AccuGauge Measurement block is moved in the channel itself. For example, an AccuGauge Measurement block (e.g., 460 and/or 560) may be positioned between AccuGauge Producer and AccuGauge Consumer. In one embodiment, the AccuGauge Measurement block may be communicatively coupled to one or more repeaters with in the channel and/or disposed between neighboring repeaters.

In some embodiments, the AccuGauge Measurement block (for example, the COUNT/CTRL blocks) can also be shared by multiple channels. For example, the AccuGauge Measurement blocks may be arranged in a centralized architecture, which may advantageously minimize area usage and power penalty, and an individual selector can bring the divided down acknowledge pulses (e.g., via a Divider block) to the centralized counter. In some embodiments, multiple Divider blocks are each associated with different channels. In another embodiment, one or more Divider blocks may be shared by multiple channels. The counter will count the pulses for a fixed amount of time to evaluate performance. The performance is determined as frequency value or as a time delay also known as latency.

Figure 6:
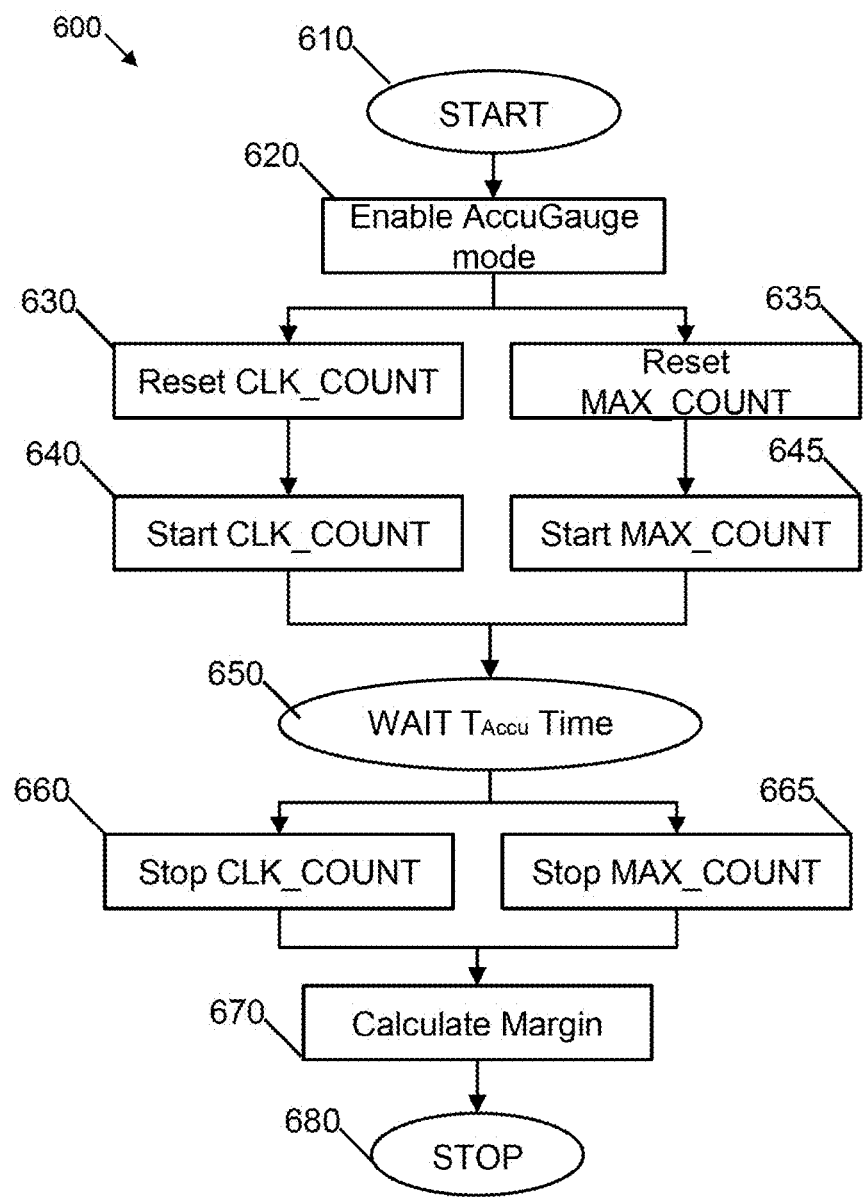
FIG. 6 is a flow chart of a process for measuring performance using the AccuGauge feature in accordance with an example embodiment.

In some implementations, TX 410 may be composed by a synchronous transmitter and a Chronos gasket to convert the output signal to asynchronous, and RX 420 may also be composed by a synchronous receiver and a Chronos gasket to convert the asynchronous signal back to synchronous domain, such as in a Chronos channel. In this implementation, AccuGauge can be used to evaluate how much timing margin is left on the channel with respect to the clock being used to push the data through the channel itself. FIG. 6 illustrates a process 600 of such an example. In process 600, AccuGauge mode is enabled (620) by, for example, a Control block of the AccuGauge Measurement block. A counter can be used to count pulses produced by the clock for a fixed amount of time (CLK_COUNT). The counter used for the CLK_COUNT may be different and separate counter than the Counter Block of the AccuGauge Measurement block. The value of that counter can be compared to the value of the AccuGauge counter for the same amount of time (MAX_COUNT). The delta of the two divided by the CLK_COUNT provides the margin available.

Figure 7:
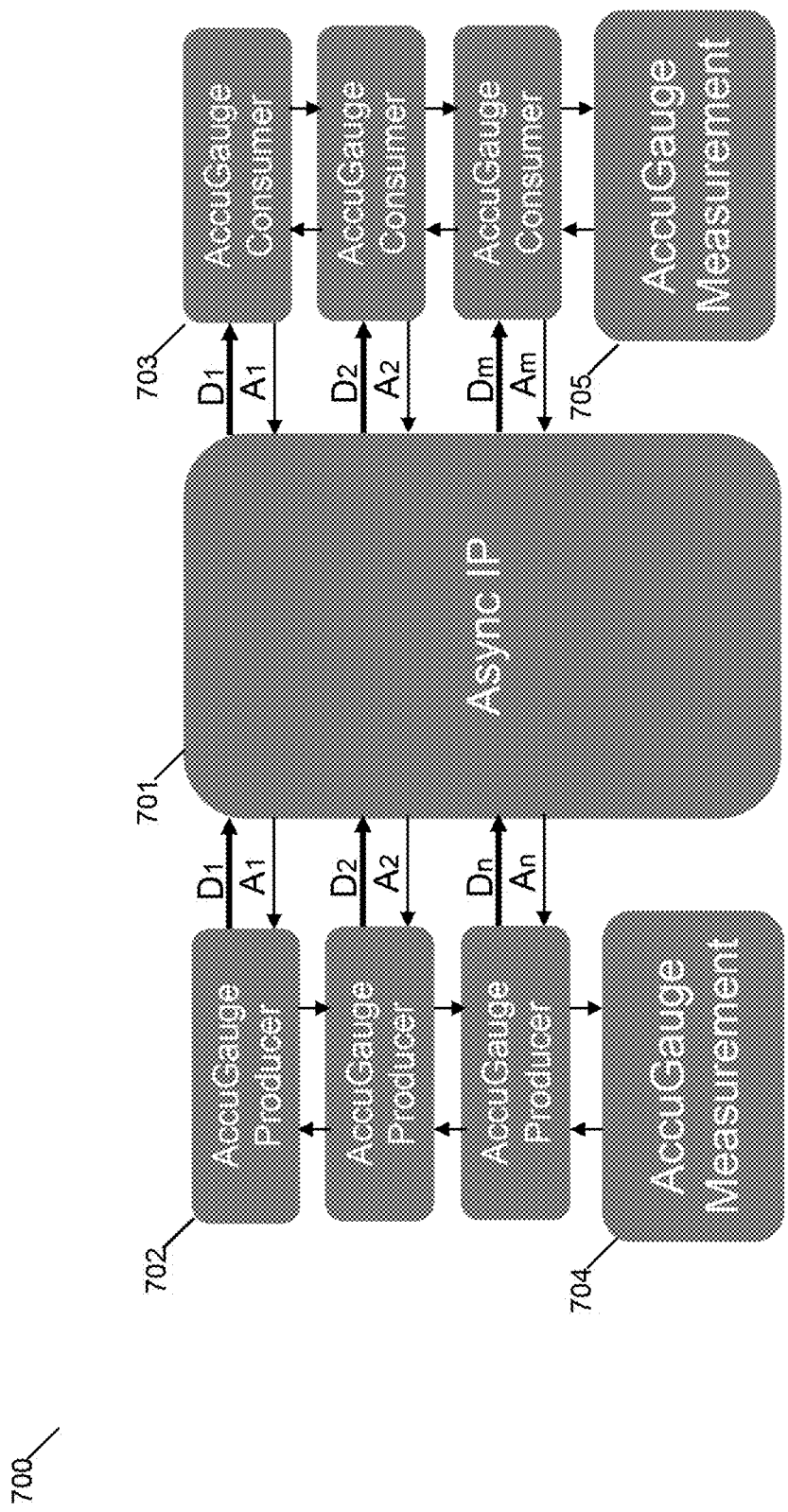
FIG. 7 is a general block diagram of the AccuGauge applied to a clock-less IP block in accordance with certain embodiments.

For example, at 630 the CLK COUNT is reset (e.g., clear and/or set to zero) and the CLK_COUNT is started at 640. At 635 the AccuGauge counter is similarly reset and started (645). Steps 630/640 and 635/645 may be performed at approximately the same time, at different times, before or after each other, or performed in parallel. The process 600 waits a predetermined duration of time (Taccu) at 650 and then stops the CLK_COUNT (650) and MAX_COUNT (665). During the Taccu, the Count block of the AccuGauge Measurement block may be counting the pulses in the acknowledgement signal. Thus, at 670 the value of the counter can be compared to the value of the AccuGauge counter for the same amount of time (MAX_COUNT), and the delta of the two divided by the CLK_COUNT provides the margin available AccuGauge technology can also be used to evaluate the performance of general asynchronous IPs, for example, IP 701 as shown in FIG. 7. Each input port of the IP 701 may be connected to an AccuGauge Producer (702) and each output port of the IP is connected to an AccuGauge Consumer (703). An AccuGauge Measurement block can be connected to either side (704,705). In some embodiments the AccuGauge Measurement block may be connected to each AccuGauge Producer/Consumer at the multiple ports individually or to multiple AccuGauge Producer/Consumer as described above. During a given performance measurement, the AccuGauge Producers/Consumers associated with the desired ports to be measured are enabled, to measure the selected timing path performance for those given ports. One or more of the AccuGauge Producer may be enabled during a given measurement window, and similarly one or more AccuGauge Consumer may be enabled.

Figure 8:
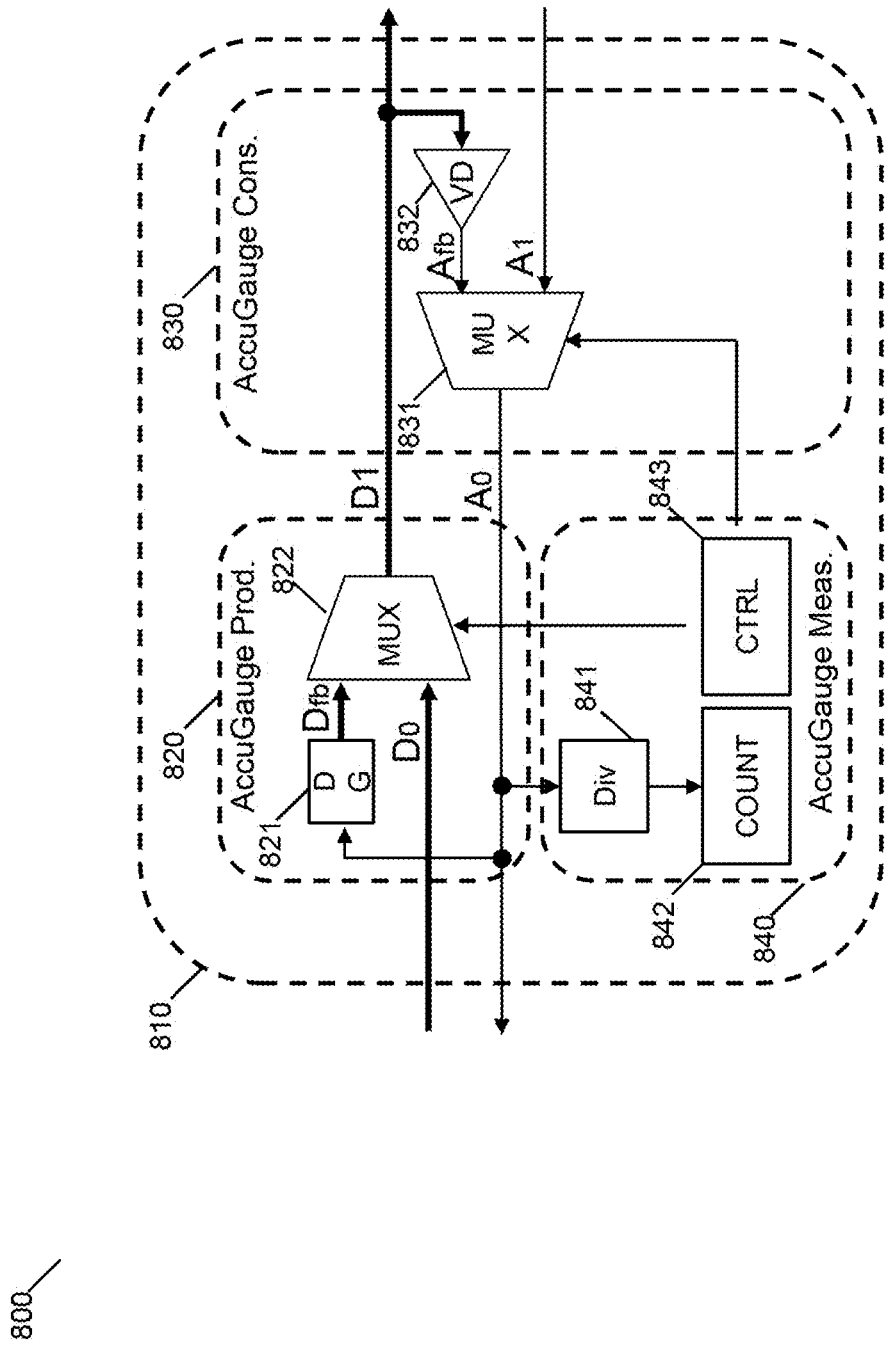
FIG. 8 is a general block diagram of the AccuGauge Port in accordance with certain embodiments.

An AccuGauge port, as illustrated in FIG. 8, is a general-purpose port which allows to add flexibility to measure throughput and latency of any IPs and asynchronous channels, including Chronos Channel. As shown in FIG. 8 an AccuGauge port 810 is composed of an AccuGauge Producer (820), an AccuGauge Consumer (830) and an AccuGauge Measurement block (840). In various embodiments, the AccuGauge Producer 820, AccuGauge Consumer 830, and AccuGauge Measurement block 840 may be substantially similar to any one or more AccuGauge Producer, AccuGauge Consumer, and/or AccuGauge Measurement block as described in the preceding figures and throughout this application.

During normal operation the port 810 may be placed in a bypass mode. In this mode the AccuGauge port 810 will not interfere with normal data flow and propagate input data (D0) received from the input data channel to the output data channel as output data D1. In this configuration, MUX (822) will always select the D0 input and MUX (831) will always select A1 received from the next stage. In this mode of operation, AccuGauge Measurement Block 840, can still be used to measure real-time performance. In some implementations, this measurement may not represent the maximum channel performance because of the TX and RX throttle capability.

During measurement mode, on the other hand, each port 810 may be configured to allow measure throughput and/or latency of any connected stage, for example, an asynchronous channel, asynchronous IP, repeaters, or any combinations of the above. In this case, the AccuGauge port, block 810 of FIG. 8, may be configured either as a Producer or as a Consumer, depending on the test selected. If port 810 is configured as a Producer, the measurement block, AccuGauge Measurement (840) in FIG. 8, may be configured to enable data generation in the AccuGauge Producer (820). The Control block 843 may be configured to transmit an enable signal instructing the MUX 822 to select the generated data (Dfb) instead of the input date D0. Similarly, the measurement block via the Control block 843 may be configured to send a signal to set the AccuGauge Consumer (830) to pass through, for example, by instructing the MUX 831 to select acknowledgement signal (A1) from the block to be tested. This way, the AccuGauge port 810 will behave like a producer and generate data to a block to be tested.

On the other hand, if the AccuGauge port is configured as a Consumer, the measurement block, AccuGauge Measurement (840), may be configured to set the AccuGauge Producer (820) to pass through and configure AccuGauge Consumer (830) to consume every new data available at its inputs via the validity detector (VD) 832. Accordingly, the MUX 831 may be instructed to select the acknowledgement signal (Afb) from the VD 832 and transmit an acknowledgement signal (A0) that may be passed through to the originating stage. This way, the AccuGauge port 810 will behave like a consumer and acknowledge to every new data received at its inputs.

In some embodiments, the AccuGauge port may be configured as both a Consumer and a Producer.

Figure 9:
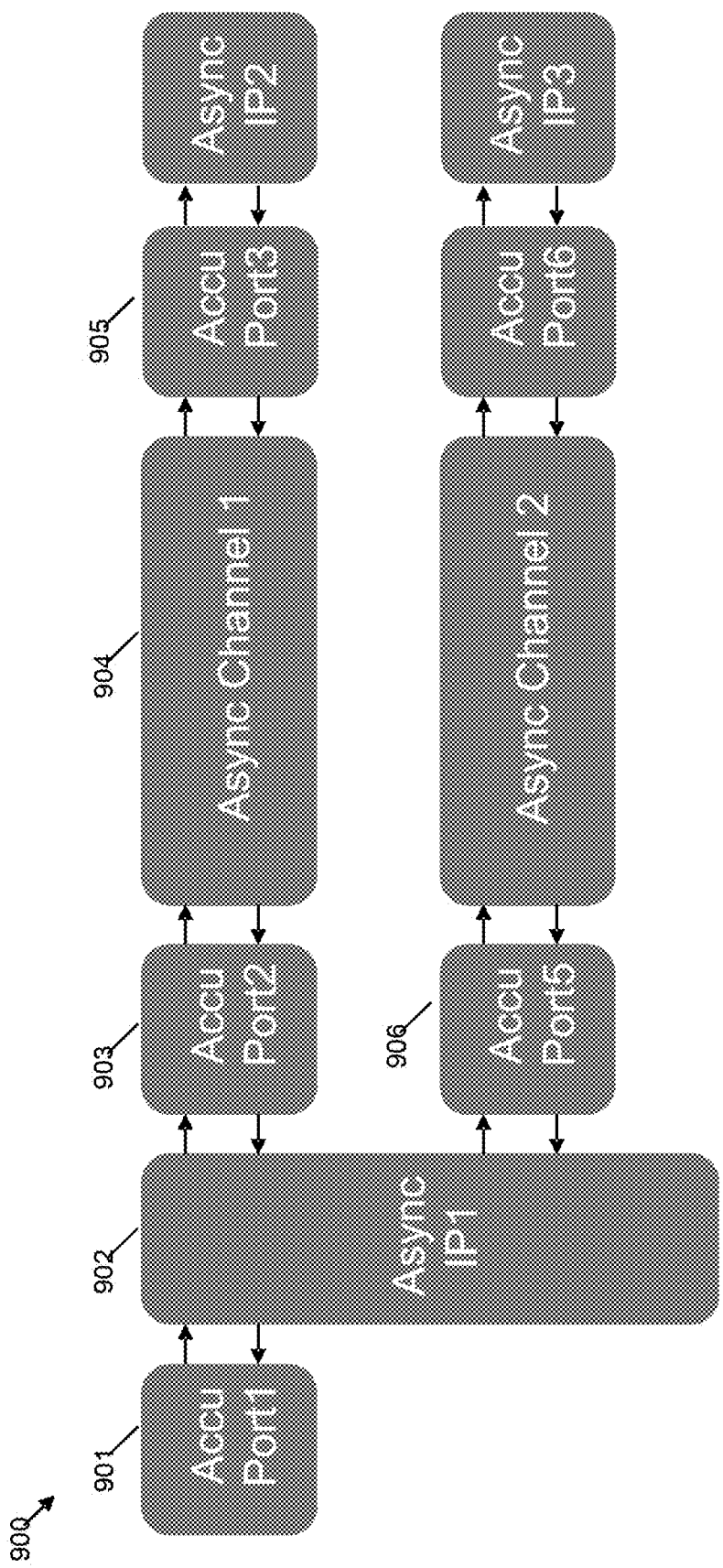
FIG. 9 is a general block diagram of an example use of the AccuGauge Port, such as described in FIG. 8, in accordance with an embodiment.

FIG. 9 shows an example of a system using AccuGauge ports, such as for example, AccuGauge port 810 of FIG. 8. The various AccuGauge ports illustrated in FIG. 9, for example, AccuGauge ports 1-5 (901, 903, 905, 906, etc.) may be representative of an AccuGauge port as described herein and throughout this application. In some embodiments, each AccuGauge port may be communicatively coupled to an AccuGauge Port or to an AccuGauge Measurement block as described herein. In some embodiments, each AccuGauge port may be associated with a single AccuGauge port and/or single AccuGauge Measurement block, or a single AccuGauge Measurement block may be communicatively coupled to one or more of the AccuGauge Ports.

In operation, to measure, for example, throughput performance of Async Channel 1 (904), AccuGauge Port2 (903) may be configured as an AccuGauge Producer and AccuGauge Port3 (905) may configured as an AccuGauge Consumer. A measurement can thus be taken by either AccuGauge Producer or Consumer Measurement block as described above in connection to FIG. 8. Thus, AccuGauge Port 3 may be configured to behave like a consumer and acknowledge to every new data received from Async Channel 1 to measure performance (e.g., throughput and/or latency). Similarly, AccuGauge Port 2 may be configured to behave like a producer and generate data and inject the same into Async Channel 1 to measure performance.

As another example, to measure performance of Async IP1 (902), AccuGauge Port1 and Port5 may be configured to measure latency between them. As such, AccuGauge Port1 (901) may be configured as AccuGauge Producer, AccuGauge Port5 (906) may be configured as AccuGauge Consumer and the latency time can be measured based on the difference between the AccuGauge Port5 and Port1 measurements.

Embodiments of AccuGauge described herein can also be used to measure chip's performance in real-time, allowing tuning of chip parameters (such as Voltage, Clock frequency, Power modes, etc.) to optimize and/or maintaining performance in different Process, Voltage and Temperature (PVT) scenarios. Modern SoCs make extensive use of Advance Voltage and Frequency Scaling (AVFS) techniques to optimize various performance and power matrix depending on usage. Voltage and frequency are throttled in real time following pre-calculated tables based on empirical data. The control system can act as either open loop (OL) where no feedback is provided or closed loop (CL) where local chip temperature is measured and provided to assess the conditions and select the best table. Both of these methodologies lack granularity and direct performance measurement to enable a more aggressive, per links and IPs, voltage and frequency scaling. Embodiments described herein facilitate measurements of performance and/or margin on individual links as well as IPs allowing a finer granularity on the AVFS tables and allowing also dynamic AVFS tables where each field can be updated based on AccuGauge measurements.

Qualification process for modern SoC is quite complex. IPs within the SoC need to meet specific Defect Per Million (DPM) requirements in order to meet the full chip DPM target which enables production in a specific process. Direct DPM measurement is usually unfeasible because of the duration of tests, so usually statistical approach is used to shorten the test time. A typical approach exercises the IP at a higher stress condition for a shorter time in order to predict failure over a longer period. The effectiveness of the method relies on having a solid correlation between failure rate and stress condition which is usually related to margin resolution. Embodiments of AccuGauge described herein facilitate a simple and effective way to predict DPM of a chip (for yield and production unit targets) by measuring the channel margin in different conditions easily allowing to produce a statistic of the channel failure based on actual margin.

Figure 10:
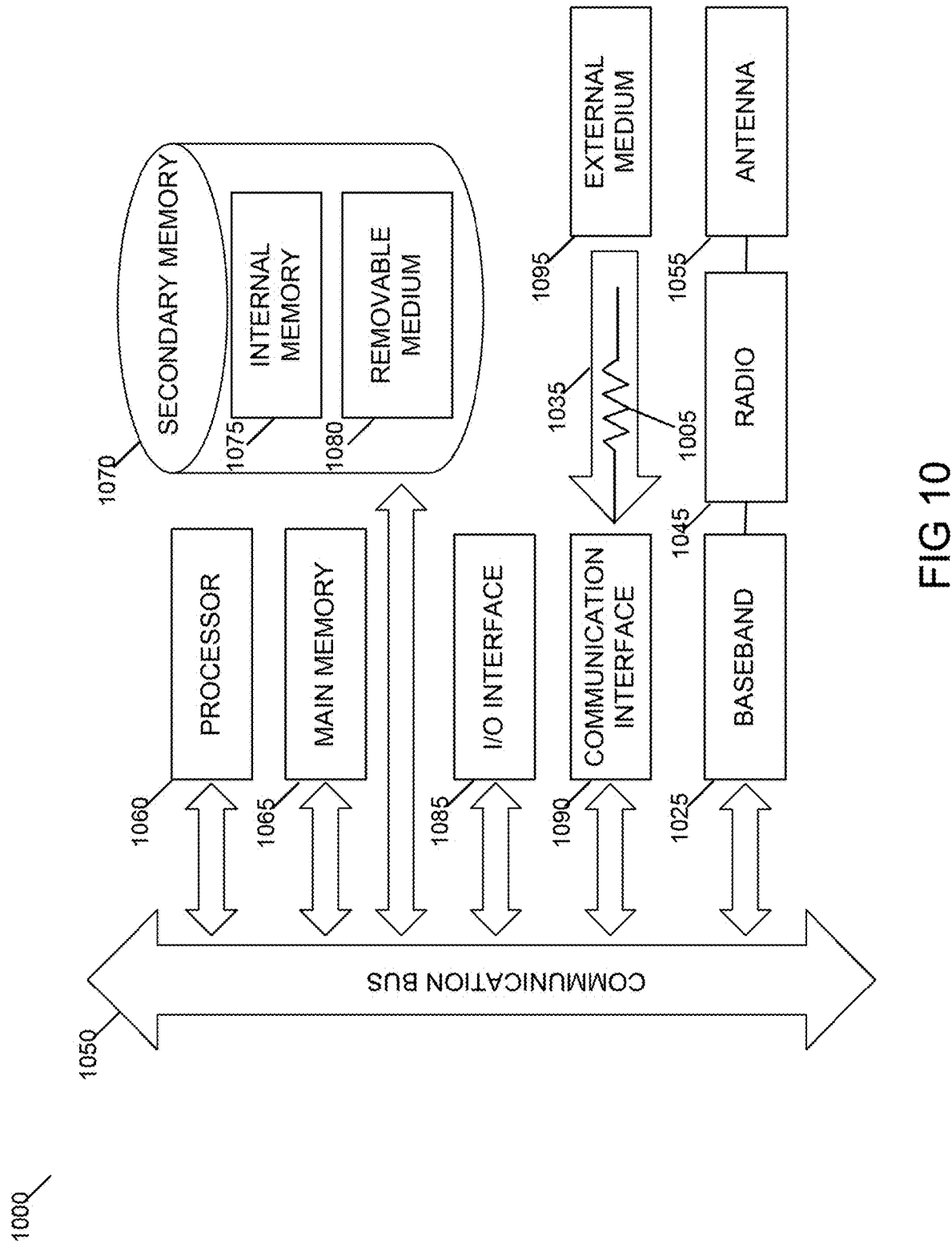
FIG. 10 shows a wired or wireless system that can be used to perform the processes described herein.

FIG. 10 is a block diagram illustrating a wired or wireless system 1000 according to various embodiments. Referring to FIGS. 1-6, the system 1000 may be used to implement and execute the features described herein and to perform the process 600. In various embodiments, the system 1000 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 1000 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1060.

The processor 1060 is preferably connected to a communication bus 1050. The communication bus 1050 may include a data channel for facilitating information transfer between storage and other peripheral components of the system 1000. The communication bus 1050 further may provide a set of signals used for communication with the processor 1060, including a data bus, address bus, and control bus (not shown). The communication bus 1050 may comprise any standard or non-standard bus architecture such as, for example, bus architectures compliant with industry standard architecture ("ISA"), extended industry standard architecture ("EISA"), Micro channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

The system 1000 preferably includes a main memory 1065 and may also include a secondary memory 1070. The main memory 1065 provides storage of instructions and data for programs executing on the processor 1060. The main memory 1065 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1070 may optionally include an internal memory 1075 and/or a removable medium 1080, for example a floppy disk drive, a magnetic tape drive, a compact disc ("CD") drive, a digital versatile disc ("DVD") drive, etc. The removable medium 1080 is read from and/or written to in a well-known manner. Removable medium 1080 may be, for example, a floppy disk, magnetic tape, CD, DVD, SD card, etc.

The removable medium 1080 is a non-transitory computer readable medium having stored thereon computer executable code (i.e., software) and/or data. The computer software or data stored on the removable medium 1080 is read into the system 1000 for execution by the processor 1060.

In alternative embodiments, secondary memory 1070 may include other similar means for allowing computer programs or other data or instructions to be loaded into the system 1000. Such means may include, for example, an external medium 1095 and a communication interface 1090. Examples of external medium 1095 may include an external hard disk drive or an external optical drive, or and external magneto-optical drive.

Other examples of secondary memory 1070 may include semiconductor-based memory such as programmable read-only memory ("PROM"), erasable programmable read-only memory ("EPROM"), electrically erasable read-only memory ("EEPROM"), or flash memory (block oriented memory similar to EEPROM). The removable medium 1080 and the communication interface 1090 allow software and data to be transferred from the external medium 1095 to the system 1000.

The system 1000 may also include an input/output ("I/O") interface 1085. The I/O interface 1085 facilitates input from and output to external devices. For example the I/O interface 1085 may receive input from a keyboard or mouse and may provide output to a display. The I/O interface 1085 is capable of facilitating input from and output to various alternative types of human interface and machine interface devices alike.

The communication interface 1090 allows software and data to be transferred between system 1000 and external devices (e.g. printers), networks, or information sources. For example, computer software or executable code may be transferred to system 1000 from a network server via communication interface 1090. Examples of communication interface 1090 include, for example, but not limited to, a modem, a network interface card ("NIC"), a wireless data card, a communications port, a PCMCIA slot and card, an infrared interface, and an IEEE 1394 fire-wire.

The communication interface 1090 preferably implements industry promulgated protocol standards, such as Ethernet IEEE 802 standards, Fiber channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 1090 are generally in the form of electrical communication signals 1005. In one exemplary embodiment, these electrical communication signals 1005 are provided to the communication interface 1090 via a communication channel 1035. In one embodiment, the communication channel 1035 may be a wired or wireless network, or any variety of other communication links. The communication channel 1035 carries the electrical communication signals 1005 and can be implemented using a variety of wired or wireless communication means including wire or cable, fiber optics, conventional phone line, cellular phone link, wireless data communication link, radio frequency ("RF") link, or infra-red link, just to name a few.

Computer executable code (i.e., computer programs or software) is stored in the main memory 1065 and/or the secondary memory 1070. Computer programs can also be received via communication interface 1090 and stored in the main memory 1065 and/or the secondary memory 1070. Such computer programs, when executed, enable the system 1000 to perform the various functions of the present invention as previously described.

In this description, the term "computer readable medium" is used to refer to any non-transitory computer readable storage media used to provide computer executable code (e.g., software and computer programs) to the system 1000. Examples of these media include the main memory 1065, the secondary memory 1070 (including the internal memory 1075, the removable medium 1080, and the external medium 1095), and any peripheral device communicatively coupled with the communication interface 1090 (including a network information server or other network device). These non-transitory computer readable mediums are means for providing executable code, programming instructions, and software to the system 1000.

In one embodiment implemented using software, the software may be stored on a computer readable medium and loaded into the system 1000 by way of the removable medium 1080, the I/O interface 1085, or the communication interface 1090. In such an embodiment, the software is loaded into the system 1000 in the form of electrical communication signals 1005. The software, when executed by the processor 1060, preferably causes the processor 1060 to perform the inventive features and functions previously described herein.

The system 1000 also includes optional wireless communication components that facilitate wireless communication over a voice and over a data network. The wireless communication components comprise an antenna system 1055, a radio system 1045 and a baseband system 1025. In the system 1000, radio frequency ("RF") signals are transmitted and received over the air by the antenna system 1055 under the management of the radio system 1045.

In one embodiment, the antenna system 1055 may comprise one or more antennae and one or more multiplexors (not shown) that perform a switching function to provide the antenna system 1055 with transmit and receive signal paths. In the receive path, received RF signals can be coupled from a multiplexor to a low noise amplifier (not shown) that amplifies the received RF signal and sends the amplified signal to the radio system 1045.

In alternative embodiments, the radio system 1045 may comprise one or more radios that are configured to communicate over various frequencies. In one embodiment, the radio system 1045 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 1045 to the baseband system 1025.

If the received signal contains audio information, then baseband system 1025 decodes the signal and converts it to an analog signal. Then the signal is amplified and sent to a speaker. The baseband system 1025 may also receive analog audio signals from a microphone. These analog audio signals are converted to digital signals and encoded by the baseband system 1025. The baseband system 1025 also codes the digital signals for transmission and generates a baseband transmit audio signal that is routed to the modulator portion of the radio system 1045. The modulator mixes the baseband transmit audio signal with an RF carrier signal generating an RF transmit signal that is routed to the antenna system 1055 and may pass through a power amplifier (not shown). The power amplifier amplifies the RF transmit signal and routes it to the antenna system 1055 where the signal is switched to the antenna port for transmission.

The baseband system 1025 may also be communicatively coupled with the processor 1060. The processor 1060 has access to main memory 1065 and/or secondary memory 1070. The processor 1060 is preferably configured to execute instructions (i.e., computer programs or software) that can be stored in the main memory 1065 or the secondary memory 1070. Computer programs can also be received from the baseband system 1025 and stored in the main memory 1065 or in secondary memory 1070, or executed upon receipt. Such computer programs, when executed, enable the system 1000 to perform the various functions of the present invention as previously described. For example, the main memory 1065 may include various software modules (not shown) that are executable by processor 1060.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A circuit, comprising:
   a producer circuit connected to a transmitter side of an asynchronous channel between a first IP block and a second IP block, the producer configured to bypass a communication path between the first and second IP blocks and comprising a data generator configured to generate a plurality of data signals each in response to receiving an acknowledgment signal of a plurality of acknowledgement signals from the asynchronous channel;

a consumer circuit connected to a receiver side of the asynchronous channel, the consumer circuit configured to bypass the communication path and comprising validity detector logic configured to detect any data signals received at the receiver from the asynchronous channel, the consumer circuit configured to generate the plurality of acknowledgment signals each in response to the detected data signals; and a measurement circuit configured to receive the plurality of acknowledgement signals from the asynchronous channel and determine a value representative of a performance of the asynchronous channel based on the received plurality of acknowledgment signals.

2. The circuit of claim 1, wherein the measurement circuit is coupled to the producer circuit and configured to receive the plurality of acknowledgment signals from the asynchronous channel.

3. The circuit of claim 1, wherein the measurement circuit is coupled to the consumer circuit and configured to receive the plurality of acknowledgment signals from the consumer circuit.

4. The circuit of claim 1, wherein the producer circuit comprises a multiplexer configured to inject at least one of a data signal of the plurality of data signals or data from the first IP block into the asynchronous channel, wherein a portion of the communicate path between the first IP block and the asynchronous channel is unaffected by producer circuit when injecting the data from the first IP block.

5. The circuit of claim 1, wherein the consumer circuit comprises a multiplexer configured to inject at least one of an acknowledgment signals of the plurality of acknowledgment signals or an acknowledgment signal from the second IP block into the asynchronous channel, wherein a portion of the communicate path between the second IP block and the asynchronous channel is unaffected by consumer circuit when injecting the acknowledgment signal from the second IP block.

6. The circuit of claim 1, the measurement circuit comprises count block configured to track a number of circuit of acknowledgement signals received by the measurement block and determine the performance of the asynchronous channel based on the received plurality of acknowledgment signals.

7. The circuit of claim 6, wherein the determined performance is an unambiguous representation of the performance of the asynchronous channel.

8. The circuit of claim 1, wherein the plurality of acknowledgement signals are received as a plurality of pulses comprising a frequency, wherein the measurement circuit comprises divider block configured to apply timing division to lower the frequency of the plurality of pulses.

9. The circuit of claim 1, wherein the asynchronous channel comprises at least one repeater connected between the first IP block and the second IP block, the repeater configured to receive a data signal, generate an acknowledgement signal, and transmit the received data to the second IP block, wherein the plurality of acknowledgement signals received by the producer circuit comprises a first acknowledgement signal from the at least one repeater based, in part, on receiving a data signal from the producer circuit and a second acknowledgment signal originating from the second IP block based, in part, on receiving the data signal from the repeater.

10. A method for assessing a performance of an asynchronous channel, the method comprising:

activating a performance measurement mode of a producer circuit and consumer circuit, the producer circuit connected to a transmitter side of an asynchronous channel between a first IP block and a second IP block and the consumer circuit connected to a receiver side of the asynchronous channel;

injecting a plurality of data signals into the asynchronous channel by the producer circuit, wherein each of the plurality of data signals is generated by the producer circuit based, in part, on receiving an acknowledgement signal from the asynchronous channel;

injecting a plurality of acknowledgement signals into the asynchronous channel by the consumer circuit, wherein each of the plurality of acknowledgement signals is generated by the consumer circuit based, in part, on detecting any data signal received from the asynchronous channel; and determining an unambiguous value based, in part, on the plurality acknowledgement signals, wherein value is representative of the performance of an asynchronous channel.

11. The method of claim 10, further comprising:
evaluating a speed margin of the asynchronous channel, wherein the evaluated speed margin facilitates a connection of at least one of a synchronous IP block to another synchronous IP block, the synchronous IP block to an asynchronous IP block, the asynchronous IP block or another asynchronous IP block, or a combination thereof.

12. The method of claim 10, further comprising:
generating the plurality of data signals by a data generator of the producer circuit; and
consuming the plurality of data signals by a validity detector logic included in the consumer circuit, wherein the generation and consumption of the data signals is independent of an operation state of the first and second IP blocks.

13. A method of claim 10, wherein the asynchronous channel is one of a plurality of asynchronous channels operating under a current operating condition, the method further comprising:
determining a plurality of unambiguous values each for a respective asynchronous channel of the a plurality of asynchronous channels; and
optimizing a performance matrix for the plurality of asynchronous channels based, in part, on tuning the unambiguous value of one or more asynchronous channels.

14. The method of claim 13, wherein the operating condition is at least one of a common power supplied to the plurality of asynchronous channels or a temperature at which the plurality of asynchronous channels are operating.

15. The method of claim 13, wherein the performance matrix comprises at least on one of electrical power or data transmission/reception speed.

16. A port, comprising:
a producer circuit configured to receive data from a first stage and forward the data to a second stage while operating in a producer bypass mode, and, while operating in a producer measurement mode, configured to generate and transmit a plurality of data signals to the second stage, each data signal generated in response to receiving an acknowledgment signal from the second stage;

a consumer circuit configured to receive an acknowledgement signal from the second stage and forward the acknowledgement signal to the first stage while operating in a consumer bypass mode, and, while operating in a consumer measurement mode, configured to generate a plurality of acknowledgment signals each in response to receiving a data signal from the second stage; and a measurement circuit configured to receive the plurality of acknowledgement signals and determine a performance value based on the received plurality of acknowledgment signals.

17. The port of claim 16, wherein the measurement circuit further comprises a control block configured to (i) set the mode of operation of the producer circuit to producer measurement mode and the mode of operation of the consumer circuit to bypass mode; (ii) set the mode of operation of the consumer circuit to consumer measurement mode and the mode of operation of the producer circuit to bypass mode; or (iii) set the mode of operation for both the producer and consumer circuits to bypass mode.

18. The port of claim 17, wherein the determined performance value is indicative of a performance of the second stage when the producer circuit is set to producer measurement mode or the consumer circuit is set to consumer measurement mode.

19. The port of claim 16, wherein the first stage and second stages comprise at least one of a first IP block, a second IP block, an input to an asynchronous, an output to an asynchronous channel, or a repeater stage.

* * * * *